(12) United States Patent
Ernst et al.

(10) Patent No.: US 9,838,583 B2
(45) Date of Patent: Dec. 5, 2017

(54) METHOD AND APPARATUS FOR VERIFYING LIGHTING SETUP USED FOR VISUAL INSPECTION

(71) Applicant: Siemens Energy, Inc., Orlando, FL (US)

(72) Inventors: Jan Ernst, Plainsboro, NJ (US); Ziyan Wu, Plainsboro, NJ (US); Kevin P. Bailey, Chuluota, FL (US); Terrence Chen, Princeton, NJ (US)

(73) Assignee: SIEMENS ENERGY, INC., Orlando, FL (US)

( * ) Notice: Subject to any disclaimer, the term of this patent is extended or adjusted under 35 U.S.C. 154(b) by 263 days.

(21) Appl. No.: 14/859,466

(22) Filed: Sep. 21, 2015

(65) Prior Publication Data

US 2017/0085760 A1 Mar. 23, 2017

(51) Int. Cl.
*H04N 5/225* (2006.01)
*G06K 9/46* (2006.01)
*G06T 7/00* (2017.01)
*H04N 17/00* (2006.01)
*G06K 9/62* (2006.01)

(52) U.S. Cl.
CPC ......... *H04N 5/2256* (2013.01); *G06K 9/4661* (2013.01); *G06K 9/6215* (2013.01); *G06T 7/001* (2013.01); *H04N 17/002* (2013.01)

(58) Field of Classification Search
CPC .. H04N 5/2256; H04N 17/002; G06K 9/4661; G06K 9/6215; G06T 7/001
See application file for complete search history.

(56) References Cited

U.S. PATENT DOCUMENTS

| 7,111,783 | B2 * | 9/2006 | Xi | G05B 19/4083 235/437 |
| 2011/0181873 | A1 * | 7/2011 | Yavets-Chen | G01N 21/55 356/237.2 |
| 2015/0045928 | A1 * | 2/2015 | Perez | B29C 67/0088 700/110 |

* cited by examiner

*Primary Examiner* — Neil Mikeska

(57) ABSTRACT

A method for verifying a lighting setup used for inspecting a micro defect. The method includes simulating a scene including a micro defect, light source and imaging device. A position of the light source and imaging device is then optimized to form an optimized simulated setup for viewing micro defect. A shadow calibration reference (SCR) having a simulated shadow field is then rendered in a location. Next, a physical imaging device and light source are positioned based on information from the optimized simulated setup to form an optimized physical setup. A physical SCR based on information from the SCR rendering is fabricated. Next, an image is captured of a physical SCR in a corresponding location associated with each SCR rendering. The optimized physical setup is verified if at least one shadow parameter from the SCR rendering is substantially similar to a corresponding shadow parameter in a corresponding image.

20 Claims, 6 Drawing Sheets

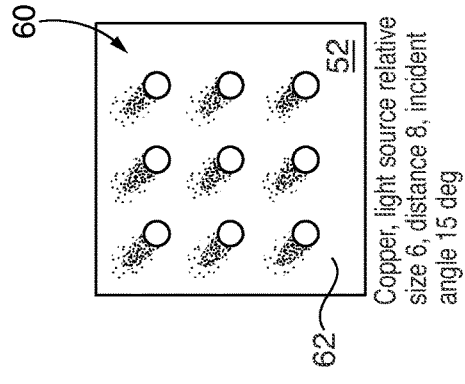
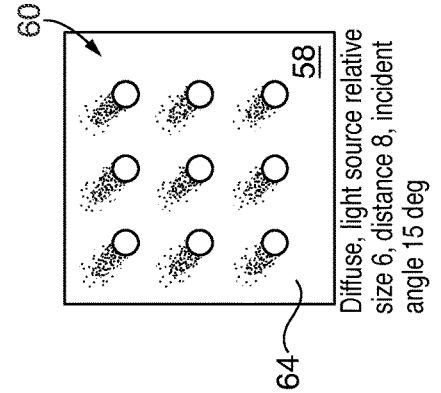
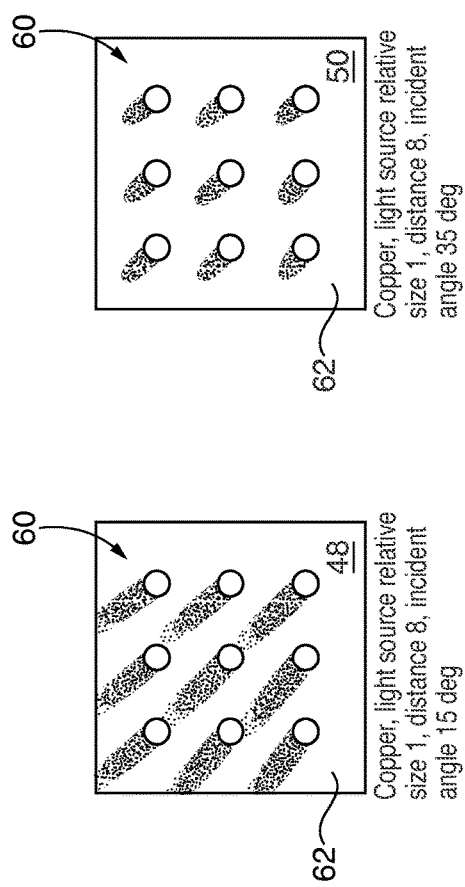
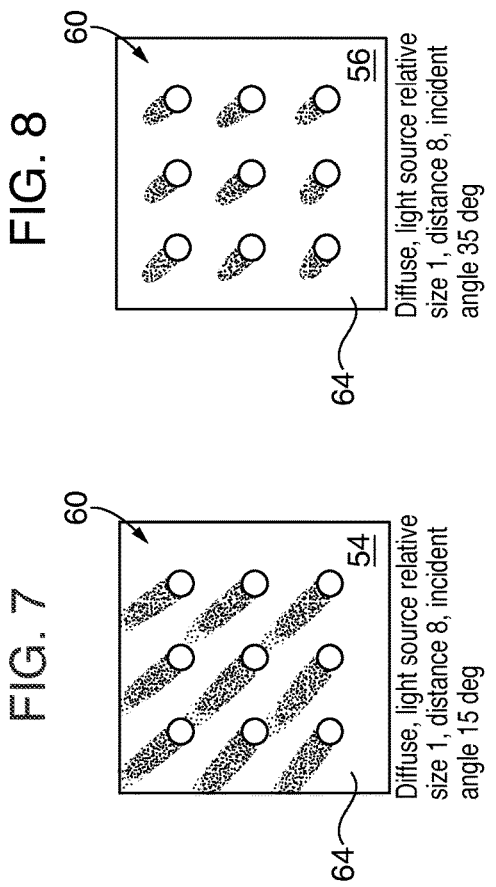

METHOD AND APPARATUS FOR VERIFYING LIGHTING SETUP USED FOR VISUAL INSPECTION

FIELD OF THE INVENTION

This invention relates to inspection systems, and more particularly, to a method for verifying a location of an imaging device and light source used to provide dark field illumination by comparing shadow parameters of a simulated shadow calibration reference with shadow parameters of a physical shadow calibration reference.

BACKGROUND OF THE INVENTION

Automated inspection systems that utilize imaging technology are frequently used to verify whether an object meets desired quality parameters and/or to measure process variability, provide process control and perform other tasks. Such systems are frequently used to perform vision-based inspection of products such as textile webs and machined parts and in industrial production environments, such as food processing and parts manufacturing.

Automated inspection systems frequently utilize a machine vision system having an imaging device, at least one illumination or light source and associated image processing equipment. An important factor in machine vision applications is the quality of illumination, as illumination plays a critical role in the appearance of patterns. Further, illumination quality takes on increased importance when the measurement process relies on specific illumination characteristics. Examples of specialized illumination characteristics are bright field, coaxial, backlight, telecentric and dark field illumination.

An exemplary setup 10 depicting light source and imaging device geometry for providing dark field illumination of a V-shaped defect 12 located on a surface 14 is shown in FIG. 1. An imaging device 16 such as a camera is located above the defect 12 at three-dimensional 3D spatial location $C(x_1, y_1, z_1)$. A light source 18 is located offset from an axis 20 of the imaging device 16 at 3D spatial location $L(x_2, y_2, z_2)$ and is oriented at an angle of illumination or incident angle $\alpha$ relative to the surface 14. The light source 18 generates sufficient light to illuminate a first portion 22 of the defect 12 to form a bright region 24 whereas a second portion 26 of the defect 12 is not illuminated to form a dark or shadow region 28 in particular, the bright 24 and shadow 28 regions are in a field of view 30 of the imaging device 16. Further, light 32 that impinges on flat surfaces (i.e. surfaces that do not include a defect 12) is reflected out of the field of view 30 of the imaging device 16.

SUMMARY OF INVENTION

A method for verifying a lighting setup used for inspecting a micro defect on a surface of an object is disclosed. The method includes generating a scene that includes a simulated micro defect, light source and imaging device. A position of the simulated light source and imaging device is optimized for viewing micro defect to form an optimized simulated setup. Next, a shadow calibration reference rendering is generated in at least one location in a field of view of the imaging device while using the optimized simulated setup wherein the shadow calibration reference rendering includes a simulated shadow field. The method also includes positioning a physical imaging device and a physical light source based on information from the optimized simulated setup to form an optimized physical setup. In addition, the method includes forming a physical shadow calibration reference based on information from the shadow calibration reference rendering. The method also includes generating an image of the physical shadow calibration reference in a corresponding location in the field of view associated with each shadow calibration reference rendering wherein each image includes a physical shadow field. Further, the method includes comparing each shadow calibration reference rendering to an image of the physical shadow calibration reference at the corresponding location in the field of view. In particular, the optimized physical setup is verified if at least one shadow parameter of at least one shadow calibration reference rendering is substantially similar to a corresponding shadow parameter in a corresponding image.

Those skilled in the art may apply the respective features of the present invention jointly or severally in any combination or sub-combination.

BRIEF DESCRIPTION OF DRAWINGS

The teachings of the present disclosure can be readily understood by considering the following detailed description in conjunction with the accompanying drawings, in which:

FIGS. 7-12 depict exemplary simulated renderings, respectively, of a simulated SCR wherein the renderings are generated using a simulated imaging device located above simulated shadow producers.

To facilitate understanding, identical reference numerals have been used, where possible, to designate identical elements that are common to the figures.

DETAILED DESCRIPTION

Figure 1:
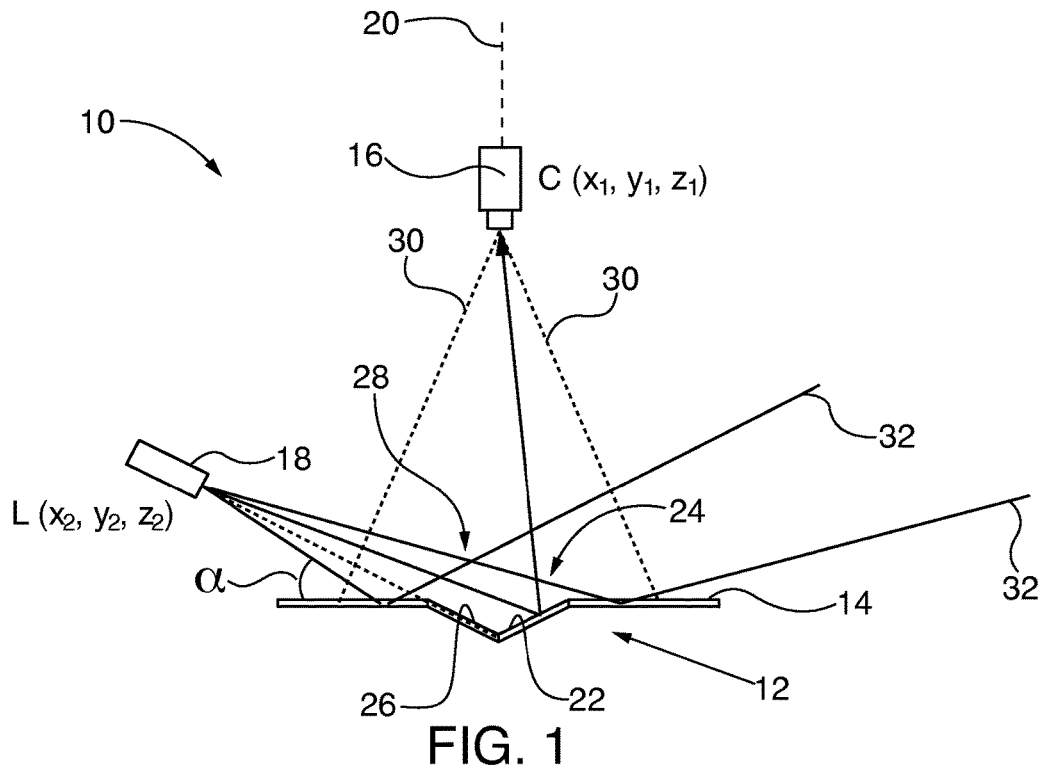
FIG. 1 is an exemplary setup depicting light source and imaging device geometry for providing dark field illumination of a V-shaped defect located on a surface.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
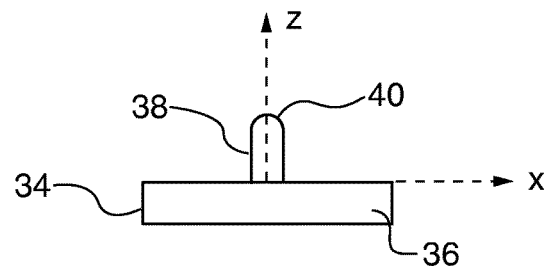
FIGS. 2-3 depict an exemplary shadow calibration reference (i.e. "SCR") in accordance with the invention.
Figure 3:
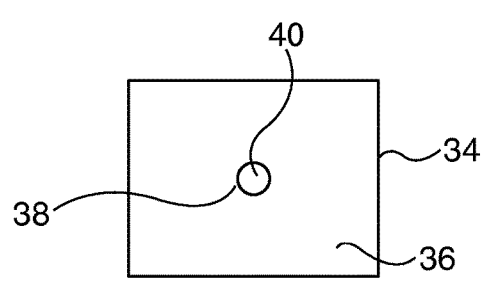

Referring to FIGS. 2-3, an exemplary shadow calibration reference (i.e. "SCR") 34 in accordance with the invention is shown. The SCR 34 includes a base element or shadow receiver 36 and an upstanding element or shadow producer 38 that extends from the shadow receiver 36. In use, the shadow producer 38 produces a shadow that is received by the shadow receiver 36. In an embodiment, the shadow producer 38 is substantially tube shaped and includes a rounded top portion 40. It is understood that other shapes may be used for the shadow producer 38 to form a suitable shadow on the shadow receiver 36. Further, the shadow producer 38 may be normal to the shadow receiver 36 or orientated at an angle relative to the shadow receiver 36. The shadow receiver 36 is sized for receiving the shadow and may have a rectangular shape although it is understood that other shapes may be used.

In accordance with the invention, a shadow function that is part of a plenoptic function is sampled. The plenoptic function describes the totality of visual appearance of a 3D scene over time. In regard to the plenoptic function, the disclosure of a document entitled "The Plenoptic Function and the Elements of Early Vision" by Edward H. Adelson and James R. Bergen, published in Computational Models of Visual Processing, Cambridge, Mass.: MIT Press, (1991), pgs. 3-20, is hereby incorporated by reference in its entirety. The shadow function relates to the properties of occlusion with respect to light sources or reflecting objects. In particular, a portion of the plenoptic function occurring at a definite time and associated with the shadow function is analyzed in the invention.

The radiometric characteristics of a shadow are not only defined by direct and indirect illumination, but also the properties regarding a bidirectional reflectance distribution function (i.e. BRDF) associated with a material of an underlying surface such as, for example, a metal or textile surface. In this regard, the disclosure of a document entitled "Directional Reflectance and Emissivity of an Opaque Surface" published in Applied Optics, Volume 4, Issue 7, doi:10.1364/AO.4.000767, (1965), pgs. 767-775, is hereby incorporated by reference in its entirety. In an embodiment, the shadow receiver 36 may be fabricated from the same material as an object to be inspected for surface defects. This allows characterizing the direct and indirect reflectance properties of the material with respect to an occluded light source.

The reflectance properties of the material are not only a function of an illumination incidence angle, but also a viewing incidence angle. In accordance with the invention, a measurement device may be utilized that is able to capture the full radiometric properties, such as a known gonioreflectometer, or a device for measuring optical characteristics of surfaces, such as a charge coupled device (i.e. "CCD") or a complementary metal-oxide-semiconductor (i.e. "CMOS") camera. Frequently, there is only one viewpoint, or only a small number of viewpoints, available in machine vision applications. Thus, the same viewpoint may be used during illumination calibration and validation. Furthermore, the current invention may be used to not only optimize and validate the illumination geometry, but also to optimize and validate camera placement.

For purposes of illustration, the current invention will now be described with reference to utilizing one imaging device 16, such as a camera, and one light source 18 although it is understood that more than one imaging device 16 and/or light source 18 may be used. In addition, for purposes of illustration, it is assumed that the desired illumination configuration is dark field illumination. In dark field illumination, the visibility of small surface discontinuities is enhanced by throwing a visible shadow, whereas a flat part of a surface that does not have discontinuities is homogeneous and has less contrast. Therefore, the desired parameters of a light source 18 include that a shadow resulting from a discontinuity is prominent, i.e. dark, and that a flat part of a surface 14 is comparatively bright. Providing such a light source 18 is difficult for materials that have non-Lambertian reflectance BRDFs, such as metals. Further, providing such a light source 18 is even more difficult in applications where the defect size is relatively small, for example defects whose size is in the micrometer range (i.e. "micro defects").

Figure 4:
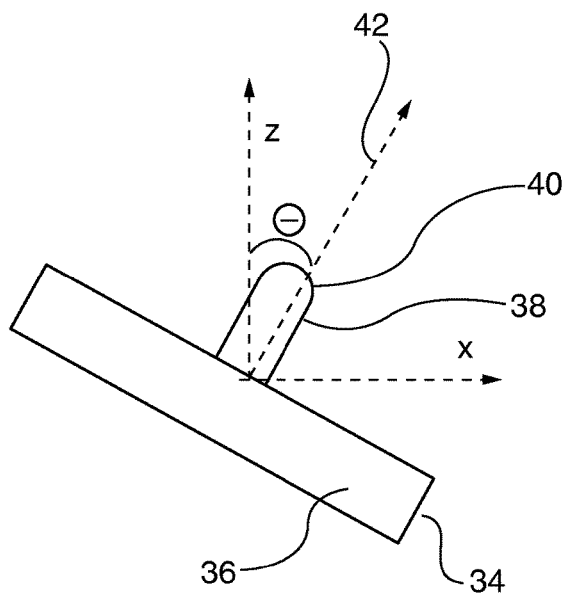
FIG. 4 depicts the location of sampling of a shadow function in the plenoptic function given by a spatial position and orientation angle of the SCR.

The SCR 34 enables sampling of the shadow function at a location in the plenoptic function given by a spatial position (i.e. x,y,z coordinates) and orientation angle θ between a longitudinal axis 42 of the shadow producer 38 and the z-axis as shown in FIG. 4. This location in the plenoptic function includes five dimensions (i.e. three Cartesian coordinates and two rotational or angular orientations). Additional locations may be sampled by moving a position in the plenoptic function, such as by translation and rotation of the SCR 34.

Figure 5:
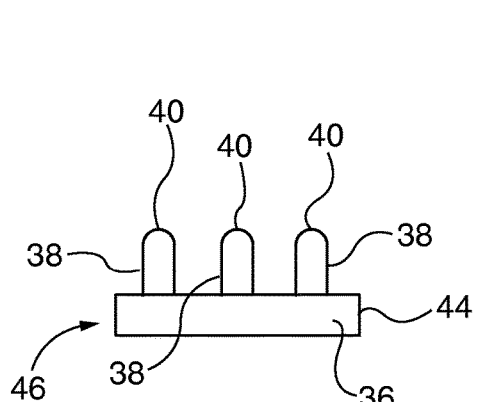
FIGS. 5-6 depict side and top views, respectively, of an alternate embodiment of an SCR.
Figure 6:
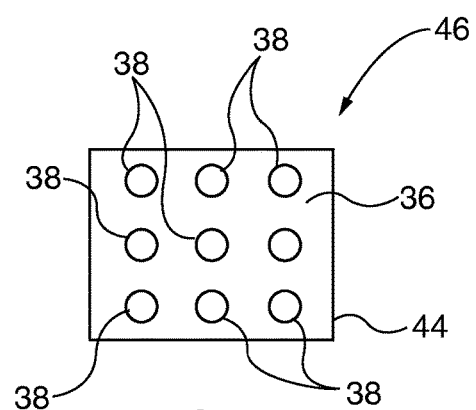

Referring to FIGS. 5 and 6 depict side and top views, respectively, of an alternate embodiment of an SCR 44. In this embodiment, the shadow producer 38 is replicated and translated to form an SCR 44 having a plurality of shadow producers 38 arranged in a two dimensional (i.e. "2D") grid pattern to form a manifold 46. The SCR 44 enables sampling of a slice of a shadow function that has two degrees of freedom. In particular, instead of sampling one five-dimensional (i.e. "5D") location in the plenoptic function, the SCR 44 enables 2D sampling (i.e. more than one location). It is understood that other configurations for the manifold 46 may be generated wherein the manifold 44 is generated by rotation in addition to translation and combinations thereof. The SCR 44 enables sampling of multiple points along various dimensions at the same time, thus reducing sampling effort.

In accordance with the invention, a desired light source 18 and imaging device 16 setup may be determined by simulation, such as by computer simulation. For example, Maya® computer modeling software sold by Autodesk, Inc. located in San Rafael, Calif., US, may be used to simulate a desired light source 18 and imaging device 16 setup. Information from the simulation is then transferred to a physical light source and imaging device setup for use in a machine vision application as will be described.

FIGS. 7-12 depict exemplary simulated renderings 48-58, respectively, of a simulated SCR wherein the renderings 48-58 are generated using a simulated imaging device (corresponding to imaging device 16) located above simulated shadow producers 60. FIGS. 7-9 each depict a simulated SCR 62 having a BRDF value corresponding to copper wherein renderings 48-52 are generated using light source relative sizes 1, 1, 6, distances 8, 8, 8 and incident angles of 15, 35, 15 degrees, respectively. FIGS. 10-12 each depict a simulated SCR 64 having a fully diffuse BRDF value wherein renderings 54-58 are also generated using light source relative sizes 1, 1, 6, distances 8, 8, 8 and incident angles of 15, 35, 15 degrees, respectively.

FIGS. 7 and 10 depict low incidence illumination resulting in long shadows, FIGS. 8-11 depict high incidence illumination (i.e. short angles) and FIGS. 9-12 depict low incidence illumination using a relatively large light source. In particular, the configuration depicted in FIGS. 9-12 diffuses the shadows significantly, resulting in shadows that are more difficult to distinguish and thus are undesirable.

Figure 13:
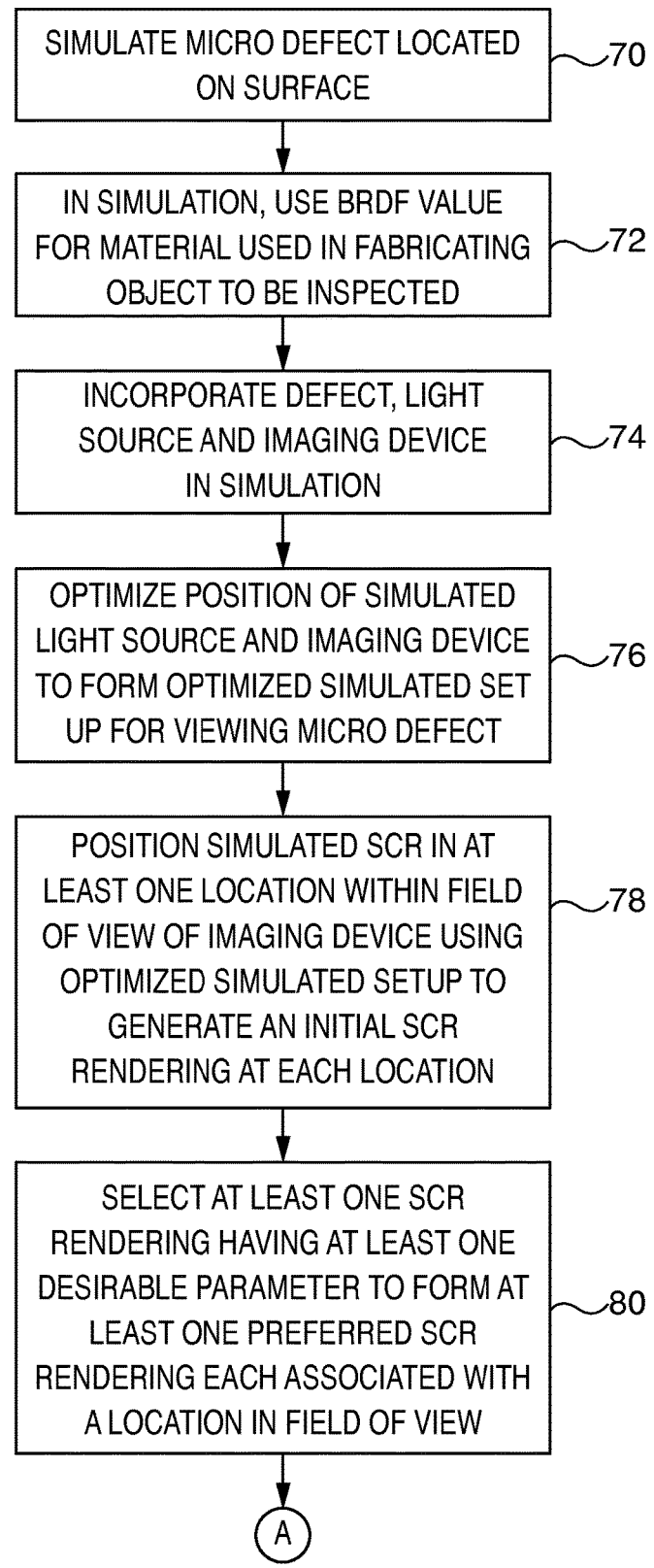
FIGS. 13-14 depict a method in accordance with the invention.
Figure 14:
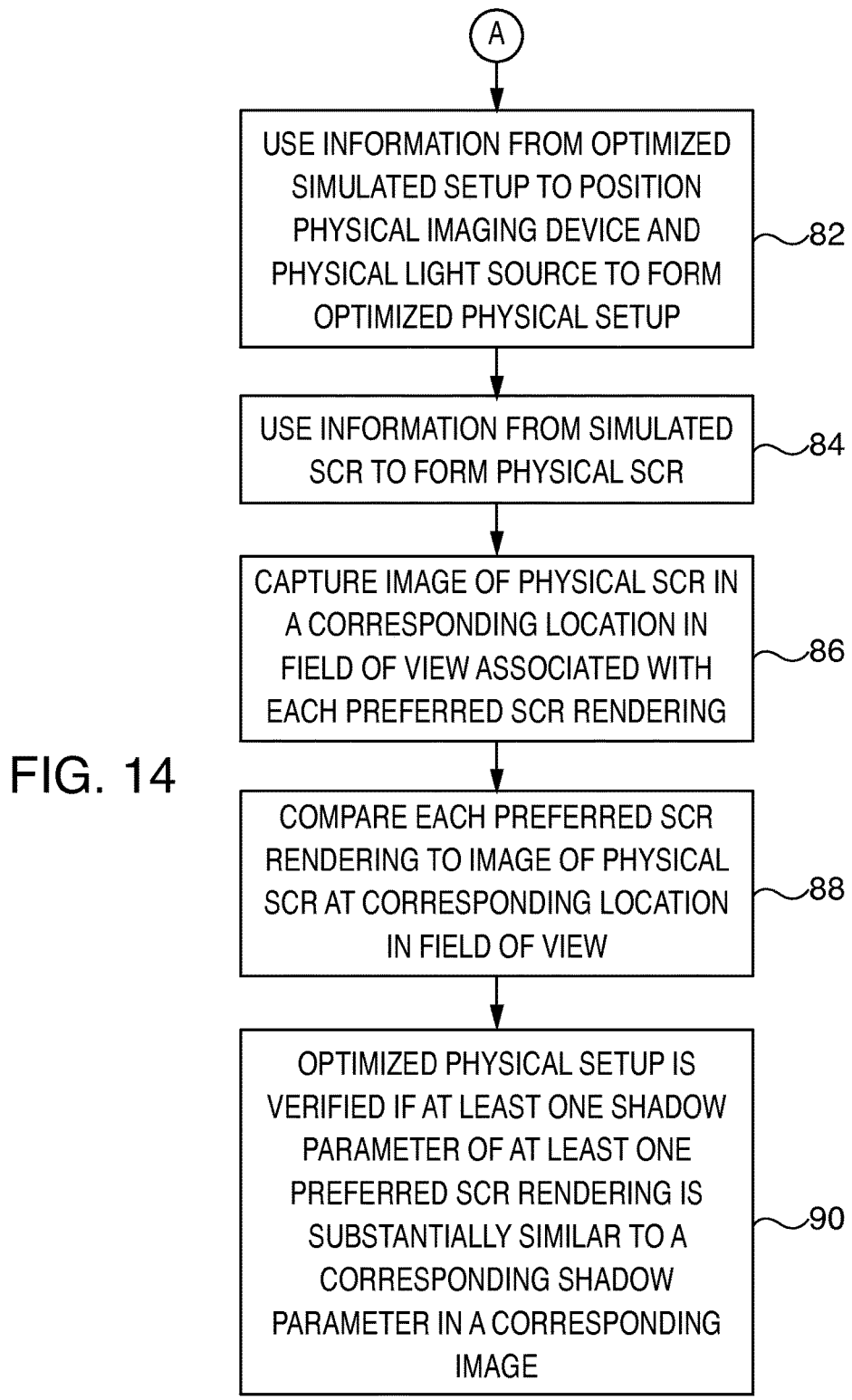

Referring to FIGS. 13-14, a method in accordance with the invention will now be described. For example, the process may be used when using dark field illumination to detect a micro defect. In Step 70 of the method, a geometric model of a micro defect located on a surface is generated by computer simulation. In Step 72, a BRDF for the material used in fabricating a physical object to be inspected is then used in the computer simulation. In Step 74, at least one simulated light source and at least one simulated imaging device are incorporated in the computer simulation, which along with the simulated micro defect, form a scene. Based on simulated renderings of the scene, positioning of the simulated light source and imaging device is optimized to form an optimized simulated light source and imaging device setup (i.e. optimized simulated setup) for viewing the micro defect at Step 76. In particular, with respect to dark field illumination, the visible contrast between a shadow area and non-shadow area (i.e. a shadow field) is optimized. In Step 78, a virtual or simulated SCR is then positioned in various locations within a field of view of the imaging device while using the optimized simulated setup so as to generate an initial simulated/rendered view of the simulated SCR at each location each depicting a simulated shadow field generated by at least one simulated shadow producer. For example, the simulated SCR may be placed in the upper left, upper center, upper right, middle left, center, middle right, lower left, lower center and lower right locations within the field of view of the imaging device. In Step 80, at least one SCR rendering having a desirable shadow parameter or a combination of desirable shadow parameters is then selected from the initial SCR renderings to form at least one preferred SCR rendering each associated with a location in the field of view. In particular, desirable shadow parameters include having sufficient contrast between a shadow area and a non-shadow area, suitable shadow length, shadows that are not diffuse and others In step 82, information from the optimized simulated setup is then used to position a physical imaging device 16 and physical light source 18 so as to form an optimized physical light source and imaging device setup (i.e. optimized physical setup) that is substantially similar to the optimized simulated setup. In Step 84, information from the simulated SCR is then used to fabricate a physical SCR having a substantially similar configuration as the simulated SCR. For example, subtractive or additive fabrication techniques may be used to replicate the SCR. In Step 86, an image is then captured of the physical SCR in the same location in the field of view (i.e. a corresponding location) used to generate each preferred SCR rendering. For example, if a preferred SCR rendering is associated with an upper left location in the field of view, an image of the physical SCR is then captured with the physical SCR also located in the upper left location in the field of view. Further, each image includes a physical shadow field. In Step 88, each preferred simulated SCR rendering is compared to the image captured of the physical SCR at the corresponding location to determine whether at least one parameter of the preferred simulated SCR rendering is substantially similar to a corresponding parameter in the image captured of the physical SCR. Such parameters include contrast between shadow areas and non-shadow areas, shadow length, diffuseness of the shadows diffuse and others. In particular, the optimized physical setup is verified if at least one parameter of the preferred simulated SCR rendering is substantially similar to a corresponding parameter in a corresponding image of the physical SCR captured at the corresponding location at Step 90.

Figure 15:
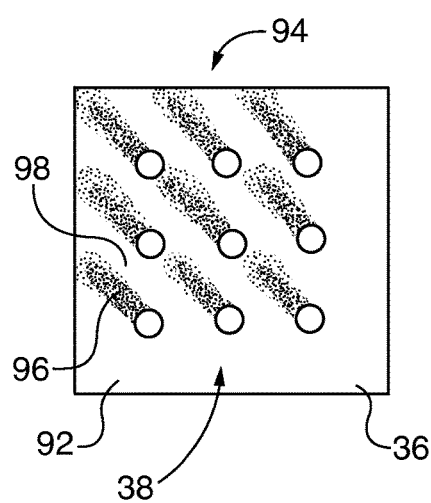
FIG. 15 depicts an exemplary image of a physical SCR that forms a shadow field having shadow areas and non-shadow areas.
Figure 16:
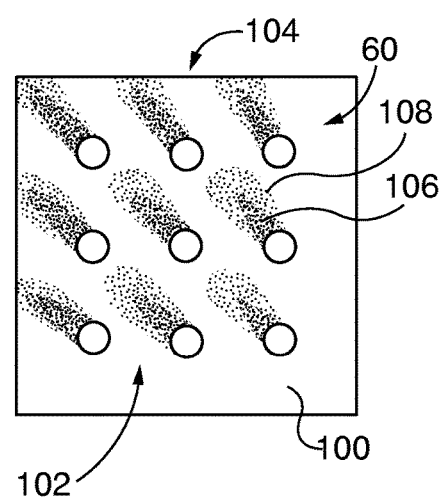
FIG. 16 depicts a simulated SCR rendering that forms a simulated shadow field having shadow areas and non-shadow areas that are substantially similar to the shadow areas and non-shadow areas generated by the SCR depicted in FIG. 15.

Referring to FIG. 15, an exemplary image of a physical SCR 92 fabricated from a diffuse material is shown. The SCR 92 includes shadow producers 38 and is illuminated by a light source 18 resulting in the formation of a shadow field 94 having shadow areas 96 and non-shadow areas 98. FIG. 16 depicts a simulated SCR rendering 100 having simulated shadow producers 102 that correspond to the shadow producers 38 of the SCR 92. The simulated SCR rendering 100 utilizes a diffuse BRDF value corresponding to that of the SCR 92. In addition, a light source and imaging device setup is utilized that includes a simulated light source having a relative size of 3, distance 8 and incident angle of 35 degrees. This results in the formation of a simulated shadow field 104 having simulated shadow areas 106 and non-shadow areas 108 that are substantially similar to the shadow areas 96 and non-shadow areas 98 generated by the SCR 92. It is frequently desirable to relocate an existing physical light source 18 and imaging device 16 setup used in an inspection facility to other locations within a facility or to a customer site, for example. Relocation of the light source 18 and imaging device 16 setup frequently requires undesirable disassembly of the physical setup and subsequent assembly and recalibration of the physical setup at a new location to ensure that the original lighting conditions are replicated. The current invention enables setup of the physical light source 18 and imaging device 16 without recalibration of the physical setup by utilizing information from the simulated light source and imaging device setup to arrange the physical light source 18 and imaging device 16 setup.

Thus, the current invention discloses, in part, a method to calibrate and validate specialized illumination setups. In particular, the current invention improves automated inspection tasks and the performance of machine vision inspection applications. In addition, the current invention provides a physical apparatus that enables a simplified sampling scheme. Under reasonable smoothness assumptions, this simplified sampling allows sufficient reconstruction of the relevant illumination properties.

In an embodiment, the current invention may be used to inspect generator wedges used in electrical generators utilized in power generation equipment. In particular, it is desirable to enhance the ability to detect micro defects in a generator wedge in order to enhance performance and service life of a generator wedge. In addition, the current invention may be used in other inspection applications such as food processing and parts manufacturing.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for verifying a lighting setup used for inspecting a micro defect on a surface of an object, comprising:

generating a scene that includes a simulated micro defect and a simulated light source and simulated imaging device;

optimizing a position of the simulated light source and imaging device to form an optimized simulated setup for viewing micro defect;

generating a shadow calibration reference rendering in at least one location in a field of view of the imaging device while using the optimized simulated setup wherein the shadow calibration reference rendering includes a simulated shadow field;

positioning a physical imaging device and a physical light source based on information from the optimized simulated setup to from an optimized physical setup;

forming a physical shadow calibration reference based on information from the shadow calibration reference rendering;

generating an image of the physical shadow calibration reference in a corresponding location in the field of view associated with each shadow calibration reference rendering wherein each image includes a physical shadow field; and comparing each shadow calibration reference rendering to an image of the physical shadow calibration reference at the corresponding location in the field of view wherein the optimized physical setup is verified if at least one shadow parameter of at least one shadow calibration reference rendering is substantially similar to a corresponding shadow parameter in a corresponding image.

2. The method according to claim 1, wherein the optimized simulated setup provides dark field illumination.

3. The method according to claim 1, wherein the shadow parameters include sufficient contrast between a shadow area and a non-shadow area, suitable shadow length and shadows that are not diffuse.

4. The method according to claim 1, wherein the physical calibration reference includes at least one shadow producer that extends from a shadow receiver.

5. The method according to claim 4, wherein the shadow producer is tube shaped.

6. The method according to claim 1, wherein the simulated light source is oriented at an angle of illumination relative to the surface.

7. The method according to claim 1, further including utilizing a bidirectional reflectance distribution function value associated with a material used in fabricating the object.

8. A method for verifying a lighting setup used for inspecting a micro defect on a surface of an object, comprising:

simulating the micro defect;

utilizing a bidirectional reflectance distribution function value associated with a material used in fabricating the object;

generating a scene that includes the simulated micro defect and a simulated light source and simulated imaging device;

optimizing a position of the simulated light source and imaging device to form an optimized simulated setup for viewing micro defect;

positioning a simulated shadow calibration reference in at least one location in a field of view of the imaging device using the optimized simulated setup to generate an initial shadow calibration reference rendering at each location in the field of view wherein the initial shadow calibration reference rendering includes a simulated shadow field;

selecting at least one initial shadow calibration reference rendering having at least one desirable shadow parameter to form at least one preferred shadow calibration reference rendering each associated with a location in the field of view;

positioning a physical imaging device and a physical light source based on information from the optimized simulated setup to form an optimized physical setup;

forming a physical shadow calibration reference based on information from the shadow calibration reference rendering;

generating an image of the physical shadow calibration reference in a corresponding location in the field of view associated with each preferred shadow calibration reference rendering wherein each image includes a physical shadow field; and comparing each preferred shadow calibration reference rendering to an image of the physical shadow calibration reference at the corresponding location in the field of view wherein the optimized physical setup is verified if at least one shadow parameter of at least one preferred shadow calibration reference rendering is substantially similar to a corresponding shadow parameter in a corresponding image.

9. The method according to claim 8, wherein the optimized simulated setup provides dark field illumination.

10. The method according to claim 8, wherein the shadow parameters include sufficient contrast between a shadow area and a non-shadow area, suitable shadow length and shadows that are not diffuse.

11. The method according to claim 8, wherein the physical calibration reference includes at least one shadow producer that extends from a shadow receiver.

12. The method according to claim 11, wherein the shadow producer is tube shaped.

13. The method according to claim 8, wherein the simulated light source is oriented at an angle of illumination relative to the surface.

14. A lighting setup used for inspecting a micro defect on a surface of an object, comprising:

a light source oriented at an angle of illumination relative to the surface;

a shadow calibration reference, wherein the shadow calibration reference includes
  a base element for receiving a shadow; and
  at least one upstanding element that extends from the base element for generating the shadow; and an imaging device located above the shadow calibration reference.

15. The lighting setup according to claim 14, wherein the upstanding element is tube shaped.

16. The lighting setup according to claim 14, wherein the shadow reference element is fabricated from a material having a bidirectional reflectance distribution function value associated with a material used in fabricating the object.

17. The lighting setup according to claim 14, wherein the light source is oriented to provide dark field illumination.

18. The lighting setup according to claim 14, wherein the at least one upstanding element produces a shadow field having shadow and non-shadow areas.

19. The lighting setup according to claim 14, wherein the defect is substantially V-shaped.

20. The lighting setup according to claim 14, wherein the imaging device is a charge coupled device or a complementary metal-oxide-semiconductor camera.

\* \* \* \* \*